United States Patent
Rangwala et al.

(10) Patent No.: US 12,470,482 B2
(45) Date of Patent: Nov. 11, 2025

(54) SMART ROUTING OF TRAFFIC IN A CLOUD COMPUTING ENVIRONMENT

(71) Applicant: Capital One Services, LLC, McLean, VA (US)

(72) Inventors: Jignesh Rangwala, Glen Allen, VA (US); Soumyajit Ray, Glen Allen, VA (US); Lee Adcock, Midlothian, VA (US); Mehulkumar Jayantilal Garnara, Glen Allen, VA (US); Vamsi Kavuri, Glen Allen, VA (US); Randall Devitto, Orland Park, IL (US)

(73) Assignee: Capital One Services, LLC, McLean, VA (US)

( * ) Notice: Subject to any disclaimer, the term of this patent is extended or adjusted under 35 U.S.C. 154(b) by 199 days.

(21) Appl. No.: 18/328,974

(22) Filed: Jun. 5, 2023

(65) Prior Publication Data
US 2024/0406105 A1   Dec. 5, 2024

(51) Int. Cl.
*H04L 45/00*   (2022.01)
*G06F 8/60*   (2018.01)
*H04L 45/76*   (2022.01)
*H04L 67/10*   (2022.01)

(52) U.S. Cl.
CPC .............. *H04L 45/70* (2013.01); *G06F 8/60* (2013.01); *H04L 45/76* (2022.05); *H04L 67/10* (2013.01)

(58) Field of Classification Search
CPC ......... H04L 45/70; H04L 45/76; H04L 67/10; G06F 8/60
See application file for complete search history.

(56) References Cited

U.S. PATENT DOCUMENTS

| | | | |
|---|---|---|---|
| 11,082,333 B1 * | 8/2021 | Lam | H04L 47/803 |
| 11,256,552 B1 * | 2/2022 | Lam | G06F 9/5083 |
| 2020/0213279 A1 * | 7/2020 | Xiong | H04L 12/4641 |
| 2021/0240459 A1 * | 8/2021 | Ranjan | G06F 9/5055 |
| 2022/0158932 A1 * | 5/2022 | Lam | H04L 45/38 |
| 2023/0100729 A1 * | 3/2023 | Kostic | H04L 47/76 370/230 |
| 2023/0115707 A1 * | 4/2023 | Khan | G06F 9/45558 718/1 |
| 2023/0205647 A1 * | 6/2023 | Sharma | G06F 11/1464 714/15 |
| 2024/0134835 A1 * | 4/2024 | Creath | G06F 16/215 |
| 2024/0406105 A1 * | 12/2024 | Rangwala | H04L 67/10 |

FOREIGN PATENT DOCUMENTS

WO   WO-2021197588 A1 * 10/2021 ......... G06F 9/45558

* cited by examiner

*Primary Examiner* — Shean Tokuta
(74) *Attorney, Agent, or Firm* — Harrity & Harrity, LLP

(57) ABSTRACT

In some implementations, a device may obtain a codebase, associated with an application and one or more services of the application, that is deployable via both a first framework of the cloud computing environment and a second framework of the cloud computing environment. The device may receive the traffic associated with the application. The device may monitor one or more metrics associated with the traffic. The device may deploy, based on the one or more metrics, the codebase via the first framework or the second framework in the cloud computing environment. The device may route, based on the one or more metrics, the traffic to the first framework or to the second framework.

20 Claims, 8 Drawing Sheets

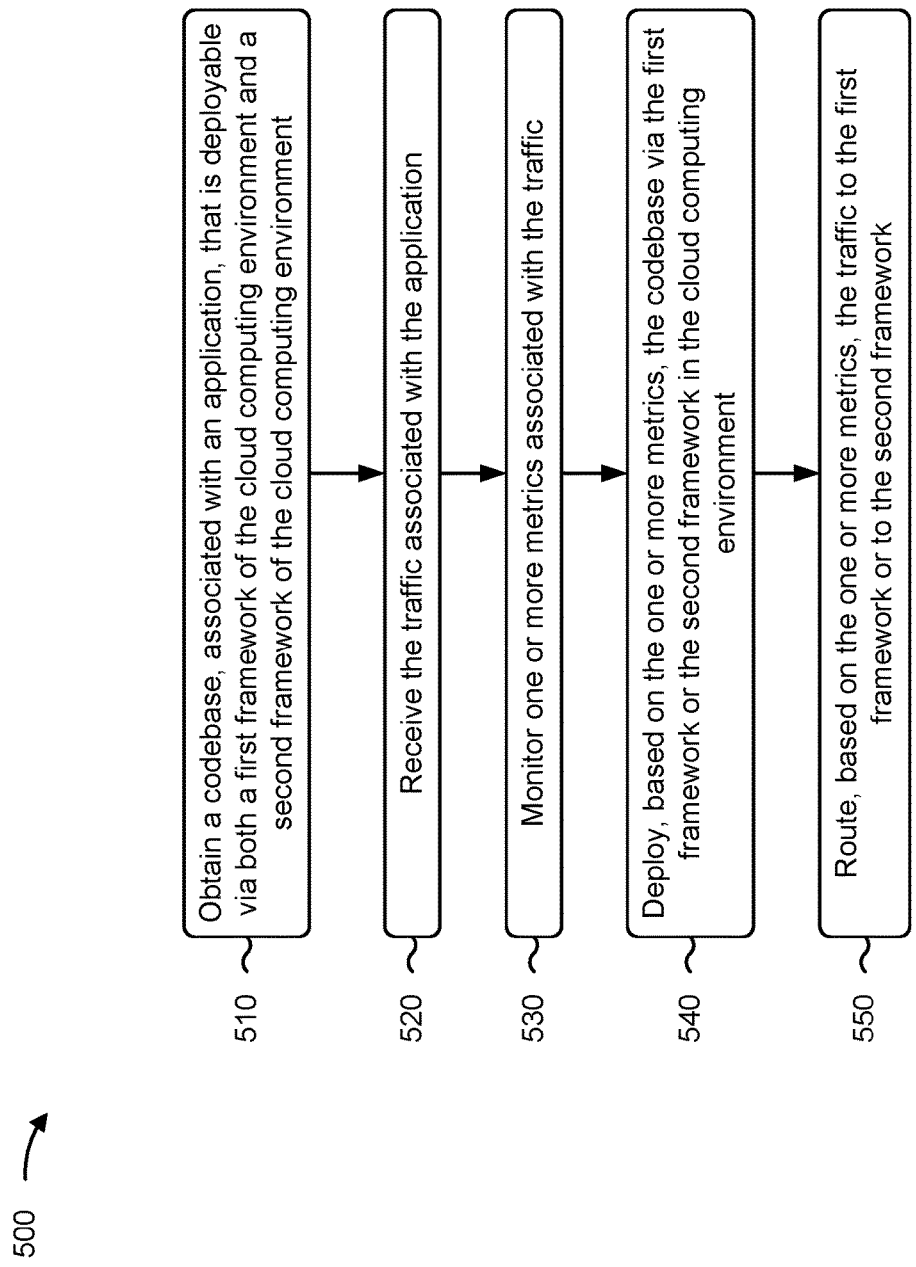

SMART ROUTING OF TRAFFIC IN A CLOUD COMPUTING ENVIRONMENT

BACKGROUND

Cloud computing is a model for delivering computing resources over a network. Cloud computing environments allow devices to access shared pools of configurable computing resources, such as servers, storage, and applications, on-demand, without the need for direct management or ownership of the underlying infrastructure. Cloud computing environments may be associated with a variety of services, such as infrastructure-as-a-service (IaaS), platform-as-a-service (PaaS), and/or software-as-a-service (SaaS), among other examples.

SUMMARY

Some implementations described herein relate to a system for routing traffic in a cloud computing environment that includes a serverless framework and a container-based framework. The system may include one or more memories and one or more processors communicatively coupled to the one or more memories. The one or more processors may be configured to obtain a codebase, associated with an application, that is deployable via both the serverless framework of the cloud computing environment and the container-based framework of the cloud computing environment, wherein the codebase is deployable via a serverless function associated with the serverless framework and via a container associated with the container-based framework. The one or more processors may be configured to receive the traffic associated with the application. The one or more processors may be configured to monitor one or more metrics associated with the traffic, wherein the one or more metrics include at least one of one or more performance metrics associated with the traffic, a time associated with the traffic, or one or more system metrics associated with the cloud computing environment. The one or more processors may be configured to deploy, based on the one or more metrics and using the codebase, the serverless function or the container in the cloud computing environment. The one or more processors may be configured to route, based on the one or more metrics, the traffic to the serverless function or to the container.

Some implementations described herein relate to a method for routing traffic in a cloud computing environment. The method may include obtaining, by a device, a codebase, associated with an application and one or more services of the application, that is deployable via both a first framework of the cloud computing environment and a second framework of the cloud computing environment. The method may include receiving, by the device, the traffic associated with the application. The method may include monitoring, by the device, one or more metrics associated with the traffic. The method may include deploying, by the device and based on the one or more metrics, the codebase via the first framework or the second framework in the cloud computing environment. The method may include routing, based on the one or more metrics, the traffic to the first framework or to the second framework.

Some implementations described herein relate to a non-transitory computer-readable medium that stores a set of instructions. The set of instructions, when executed by one or more processors of a device, may cause the device to obtain a codebase, associated with an application, that is deployable via both a serverless framework of a cloud computing environment and a container-based framework of the cloud computing environment. The set of instructions, when executed by one or more processors of the device, may cause the device to receive traffic associated with the application. The set of instructions, when executed by one or more processors of the device, may cause the device to predict, via a machine learning model, one or more metrics associated with the traffic. The set of instructions, when executed by one or more processors of the device, may cause the device to deploy, based on the one or more metrics and using the codebase, a serverless function associated with the serverless framework or a container associated with the container-based framework. The set of instructions, when executed by one or more processors of the device, may cause the device to route, based on the one or more metrics, the traffic to the serverless function or to the container.

BRIEF DESCRIPTION OF THE DRAWINGS

FIG. 5 is a flowchart of an example process associated with smart routing of traffic in a cloud computing environment, in accordance with some embodiments of the present disclosure.

DETAILED DESCRIPTION

Figure 1A:
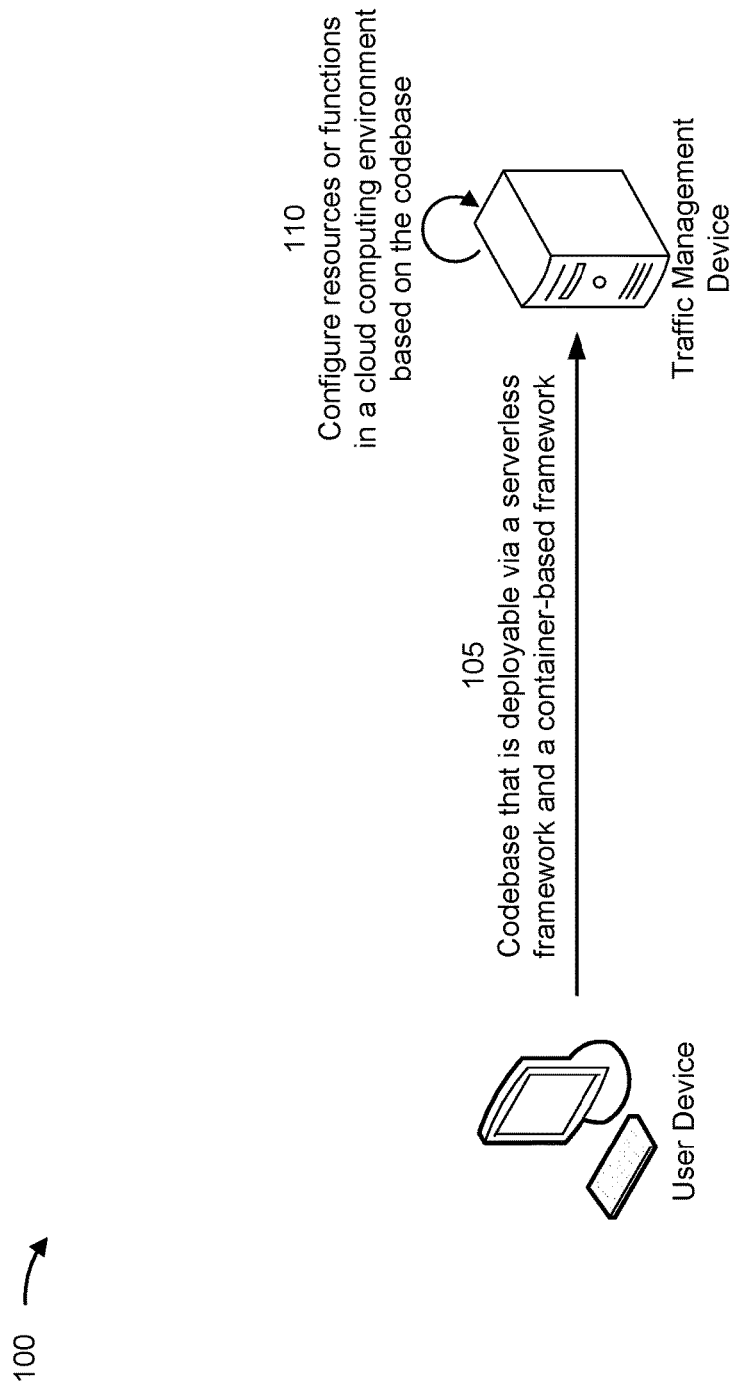
FIGS. 1A-1D are diagrams of an example associated with smart routing of traffic in a cloud computing environment, in accordance with some embodiments of the present disclosure.

The following detailed description of example implementations refers to the accompanying drawings. The same reference numbers in different drawings may identify the same or similar elements.

A cloud computing provider may provide a set of cloud computing services to an entity (e.g., a company, an organization, or an institution) via a cloud computing environment. The entity may have multiple accounts with the cloud computing provider, such that each of the multiple accounts may have access to a different subset of the set of cloud computing services. Further, the entity may be associated with a plurality of users (e.g., employees of the entity or other individuals associated with the entity) who may each have access to particular accounts of the multiple accounts. Accordingly, a large number of cloud computing resources may be deployed to various users of the entity.

Some tasks are particularly suitable for execution in a cloud computing environment. A "task" may refer to a computational process for a computer (e.g., execution of a model, sorting and classification of a data set, or migration of a database to another data structure, among other examples). A task may include multiple computational processes that are all logically grouped in a same job. For example, a user may write a configuration file (or another data structure including task instructions) that instructs a cloud environment to perform a job that includes a series of computational processes.

Tasks associated with large data sets are often more efficient to execute in virtual environments rather than on local machines. For example, tasks associated with large computational power are often more efficient to execute on distributed computing networks rather than on local machines. There are multiple providers of cloud computing resources. For example, Amazon® provides Elastic Compute Cloud (EC2®) and Elastic Kubernetes Service (EKS), among other examples. Similarly, Google® provides the Google Compute Engine (GCE) and the Google Cloud Dataproc. Microsoft® offers Azure® Virtual Machines and Azure Data Lake Analytics.

In some examples, a cloud computing environment may be associated with a "serverless" framework. A serverless framework may refer to a cloud architecture in which developers may build and run applications and services without the need for provisioning or managing servers. For example, a serverless framework may allow developers to take advantage of the scalability, reliability, and cost-effectiveness of cloud-based infrastructure without having to provision or manage the underlying infrastructure. When using a serverless framework, developers may write code that runs in response to specific events, such as incoming application programming interface (API) requests (e.g., calls) or changes in data storage. The cloud provider may be responsible for running and scaling the code, as well as providing the necessary resources and/or infrastructure, such as memory and computing power, among other examples. Because serverless frameworks may only charge for the specific resources and computing time used, a serverless framework can be a cost-effective solution for applications that have unpredictable workloads or experience sudden spikes in traffic (e.g., a cloud provider only charges an entity for the cloud resources actually used). Additionally, serverless frameworks also provide built-in high availability and auto-scaling capabilities, so a task can automatically scale up or down based on the number of requests associated with the take, which can help ensure that the task is always available and responsive. One example of a serverless framework is the Amazon Web Services (AWS®) Lambda framework.

As another example, a cloud computing environment may be associated with a container-based framework. A container-based framework may refer to a method of packaging and deploying applications in isolated containers in the cloud computing environment. Containers provide a lightweight, portable and consistent environment for applications to run in, making it easier to manage and deploy applications at scale. In a container-based framework, each application runs in its own container, with its own dependencies and configuration. This allows for applications to be deployed and run consistently across different environments, such as development, testing, and production, without any modification. A container-based framework may enable resource isolation because containers may be associated with their own resources such as processors, memory, and/or storage, allowing multiple containers to run on the same host without interfering with each other. A container-based framework may be associated with a container orchestration tool which is responsible for managing the deployment, scaling, and/or management of containers. The orchestration tool may communicate with a host operating system of the cloud computing environment to manage containers and ensure that the containers are running as expected or configured. However, an entity may be responsible for the cost of maintaining or managing resources (e.g., cloud resources) associated with a container that is deployed in the cloud computing environment (e.g., even if no tasks are being performed via the container). For example, the cloud provider may charge for the utilization of cloud resources in a container-based framework regardless of whether the cloud resources are being used to perform tasks (e.g., the cloud provider may charge for the containers as long as they containers are deployed or "on" in a pay-as-you-go model).

Therefore, in some scenarios, it may be more efficient (e.g., more cost efficient and/or more efficient in terms of cloud resource utilization) to perform tasks (e.g., associated with an application, service, and/or API) in the cloud computing environment using a serverless framework (e.g., via a serverless function). In other scenarios, it may be more efficient (e.g., more cost efficient and/or more efficient in terms of cloud resource utilization) to perform tasks (e.g., associated with an application, service, and/or API) in the cloud computing environment using a container-based framework (e.g., via a container). For example, for low transactions per second (TPS) level scenarios, the serverless framework may be more efficient because the serverless framework automatically scales down a utilization of cloud resources. However, as a TPS level increases for an application or server, the serverless framework may become less efficient than the container-based framework because the serverless framework automatically scales up a utilization of cloud resources in response to the increased TPS level.

However, it may be difficult to switch between a serverless framework and a container-based framework in a cloud computing environment for tasks associated with a given application, service, or API. For example, to use both a serverless framework and a container-based framework in a cloud computing environment, separate codebases for the given application, service, or API may be written and deployed. A codebase may refer to a collection of source code that makes up a software project. A codebase may include code files, configuration files, libraries, and/or any other resources necessary to build and execute the software. For example, separate codebases may be developed and deployed to enable tasks to be performed via the serverless framework and the container-based framework. This consumes time, processing resources, memory resources, and/or network resources, among other examples, associated with developing and deploying separate versions of a codebase for a given application, service, and/or API.

Further, to enable traffic and/or tasks associated with a given application, service, and/or API to be switched between the different frameworks, instances of respective codebases for the given application, service, and/or API may need to be deployed simultaneously in the serverless framework and the container-based framework. However, in some cases, only one of the instances may be used at a given time to perform tasks and/or manage traffic for the given application, service, and/or API. This consumes processing resources, memory resources, and/or network resources, among other examples, associated with simultaneously deploying and using cloud resources and/or separate instances in different frameworks for the same application, service, and/or API.

In some cases, a cloud computing environment may use a load balancer (e.g., AWS offers an application load balancer (ALB)) to route traffic within the cloud computing environment. A load balancer is a service that helps distribute incoming network traffic across multiple servers or instances. The load balancer may be a layer 7 load balancer that operates at the application layer, using application-specific information, such as hypertext transfer protocol (HTTP) headers, to make routing decisions. For example, the load balancer may distribute incoming traffic to multiple targets, such as cloud resource instances or containers, based on the content of requests. For example, the load balance may route traffic between multiple targets based on rules that are defined in a routing table. The routing table can be configured to match incoming requests based on different attributes, such as the path, host name, and/or query parameters of the request, among other examples. The load balancer may also perform application specific routing, such as content-based routing (e.g., routing requests based on the content of the request), secure sockets layer (SSL) offloading, and/or sticky sessions (e.g., routing a given user's requests to the same target instance, which can be useful for applications that are associated with stateful connections), among other examples. This enables the load balancer to distribute requests to specific targets based on their characteristics and optimize application performance. However, a load balancer may only be capable of routing traffic between instances associated within a given framework of the cloud computing environment. Further, the load balancer may not have access to information to make determinations as to when the serverless framework or the container-based framework is more efficient.

Some implementations described herein enable smart routing of traffic in a cloud computing environment. For example, some implementations described herein are associated with routing traffic (e.g., for a given application, service, and/or API) to either a serverless framework of the cloud computing environment or a container-based framework of the cloud computing environment based on one or more metrics associated with the traffic. In some implementations, the one or more metrics may include performance metrics associated with the traffic, a time associated with the traffic, and/or one or more system metrics associated with the cloud computing environment, among other examples.

A system may obtain a codebase, associated with an application, that is deployable via both the serverless framework of the cloud computing environment and the container-based framework of the cloud computing environment. The system may monitor the one or more metrics and may deploy, based on the one or more metrics and using the codebase, a serverless function or a container in the cloud computing environment. The system may route the traffic to the serverless function or to the container. If the one or more metrics change over time, then the system may deploy the codebase in a different framework (e.g., from the serverless framework and the container-based framework) and route traffic of the application to the different framework. In some implementations, the system may automatically scale down, or stop, a utilization of cloud resources in a framework that is not being utilized by the application.

As a result, because the codebase is deployable via both the serverless framework and the container-based framework, only a single codebase is developed, deployed, and/or maintained by the system. This conserves processing resources, memory resources, and/or network resources, among other examples, that would have otherwise been associated with developing and deploying separate versions of a codebase for a given application. Additionally, because the codebase is deployable via both the serverless framework and the container-based framework and because the system deploys the codebase via the appropriate framework (e.g., based on the one or more metrics), the application may only use cloud resources associated with a single framework at a given time. This conserves processing resources, memory resources, and/or network resources, among other examples, that would have otherwise been associated with simultaneously deploying and using cloud resources and/or separate instances in different frameworks for the same application.

FIGS. 1A-1D are diagrams of an example 100 associated with smart routing of traffic in a cloud computing environment. As shown in FIGS. 1A-1D, example 100 includes a traffic management device, a user device, one or more client devices, and a cloud computing environment. These devices are described in more detail in connection with FIGS. 3 and 4.

The cloud computing environment may include a serverless framework and a container-based framework. The serverless framework may use one or more serverless functions to perform tasks. A serverless function may be code that runs in the cloud computing environment and is executed in response to a specific trigger or event. A serverless function may be referred to interchangeably herein as a lambda function and/or an anonymous function. The serverless function may be stateless, meaning that the serverless function does not retain any data or state between invocations. This allows the serverless function to scale horizontally and be triggered multiple times concurrently without interference.

Additionally, the serverless function may be managed by a cloud provider associated with the cloud computing environment. Therefore, developers (e.g., associated with developing the task or service) may not need to provision or maintain servers or infrastructure associated with performing the task or service. Instead, the developers can simply upload code and configure the triggers and events that will invoke the serverless function and the cloud provider may handle provisioning resources and infrastructure associated with executing the code via the serverless function. A given serverless function may be referred to as an instance of a serverless function. Serverless functions may be cost effective because the developers may only be charged (e.g., for use by the cloud provider) for the duration of the function execution and will not incur any charges when serverless functions are not running. This makes serverless functions well-suited for applications that require frequent, short-duration executions, such as image or video processing, data stream processing, and/or real-time data analysis, among other examples.

The container-based framework may use one or more containers or virtual machines (VMs) to perform tasks. Although some examples are described herein associated with containers in the container-based framework, VMs may also be used in a similar manner as described herein. Containers may be lightweight, portable, and self-contained units of software that can be deployed and run consistently across different environments. A container-based framework provides a set of tools and services for managing containers (or VMs), such as orchestration, networking, storage, and/or security, among other examples. The container-based framework may abstract away the underlying infrastructure, allowing developers to focus on building and deploying applications without worrying about the underlying infrastructure. The Container-based framework may be well-suited for cloud computing because the container-based framework enables applications to be deployed and executed consistently across different cloud environments, such as public clouds, private clouds, and/or hybrid clouds, among other examples. Containers can be easily moved between environments, providing flexibility and portability for applications.

The cloud computing environment described herein may be associated with a cloud provider. For example, the cloud provider may offer both a serverless framework and a container-based framework within a cloud computing environment managed by the cloud provider. The cloud provider may have different pricing plans or rates for utilization of cloud resources associated with different frameworks. For example, for the serverless framework, the cloud provider may charge based on the actual utilization of cloud resources. For example, as described elsewhere herein, the serverless framework may automatically scale the utilization of cloud resources based on a demand of incoming traffic or requests. Therefore, if demand of the traffic is lower (e.g., a lower TPS or requests per second), then less cloud resources will be used. Therefore, the cloud provider may charge a lower amount for the use of the serverless framework over a given time period. However, if demand for the traffic is higher (e.g., a higher TPS or requests per second), then more cloud resources will be used. Therefore, the cloud provider may charge a greater amount for the use of the serverless framework over the given time period. In other words, the cloud provider may use a "pay for what you use" model for charging for the use of the serverless framework.

For the container-based environment, the cloud provider may charge for containers, VMs, or instances deployed in the container-based environment regardless of whether the containers, VMs, or instances are actually being used to perform tasks. For example, an entity may be responsible for the cost of maintaining or managing resources (e.g., cloud resources) associated with a container that is deployed in the cloud computing environment (e.g., even if no tasks are being performed via the container), such as in a "pay-as-you-go" charging model.

As shown in FIG. 1A, and by reference number 105, the traffic management device may obtain a codebase associated with an application. As used herein, the application may be an application associated with a single service, an application associated with multiple services, and/or an API, among other examples. For example, the traffic management device may obtain the codebase from a user device. For example, the user device may upload the codebase to the traffic management device. In some examples, the traffic management device may obtain the codebase from a code repository or another server device.

The codebase may be deployable via both the serverless framework of the cloud computing environment and the container-based framework of the cloud computing environment. "Deployable" may refer to the codebase being capable of being deployed and/or executed using cloud resources of a given framework. For example, the codebase may include source code, code files, configuration files, libraries, and/or any other resources associated with executing software associated with the application. For example, the codebase may include files, code, and/or libraries that are needed for the codebase to be deployed via both the serverless framework and the container-based framework. In other words, a single codebase (e.g., the same codebase) may be used to deploy or execute tasks associated with the application in both the serverless framework and the container-based framework. For example, the single codebase (e.g., the same codebase) may be deployed via a serverless function and via a container.

For example, the codebase may include a first one or more configuration files and/or libraries, among other examples, associated with the serverless framework and a second a first one or more configuration files and/or libraries, among other examples, associated with the container-based framework. For example, the serverless framework and the container-based framework may be associated with different configuration files, different libraries, and/or different framework-specific code (e.g., code or source code that is associated with a specific framework), among other examples. The codebase may include the information needed for both frameworks to successfully deploy and/or execute the codebase.

The codebase may be designed such that when the codebase is provided to a serverless function, the serverless function is enabled to identify and/or execute code, configuration file(s), and/or libraries associated with executing the application via the serverless framework. Similarly, the codebase may be designed such that when the codebase is provided to a container, the cloud computing environment is enabled to identify and/or execute code, configuration file(s), and/or libraries associated with executing the application via the container-based framework. This enables a single codebase to be used for the application, regardless of whether the container-based framework or the serverless framework is used to perform tasks associated with the application. This conserves time, processing resources, memory resources, and/or network resources, among other examples, that would have otherwise been used to develop, store, and/or provide different versions of the codebase for each framework. Additionally, this reduces the complexity associated with switching or routing (e.g., dynamically, as described elsewhere herein) traffic associated with the application to the serverless framework or the container-based framework (e.g., because different versions of the codebase do not need to be identified, obtained, and/or deployed).

As shown by reference number 110, the traffic management device may configure resources or functions in the cloud computing environment based on the codebase. For example, the traffic management device may configure one or more serverless functions and/or one or more containers associated with the codebase. For example, the codebase (e.g., via a configuration file) may indicate an initial framework to be used for the application. The traffic management device may configure resources or functions in the cloud computing environment based on the initial framework. For example, if the initial framework is the serverless framework, then the traffic management device may configure one or more serverless functions to be used to perform tasks associated with the application. If the initial framework is the container-based framework, then the traffic management device may configure one or more containers to be used to perform tasks associated with the application.

Additionally, the traffic management device may configure information and/or files to be used to quickly deploy the codebase via one (or both) of the frameworks. For example, the traffic management device may prepare files and/or information associated with deploying the codebase via each framework. This may reduce a processing time associated with switching traffic from being routed from one framework (e.g., of the serverless framework or the container-based framework) to another framework (e.g., of the serverless framework or the container-based framework). In some implementations, the traffic management device may configure one or more triggers or thresholds associated with switching which framework is to be used to support the traffic of the application, as described in more detail elsewhere herein. In some implementations, the one or more triggers or thresholds may be indicated by the codebase. In other examples, the traffic management device may determine the one or more triggers or thresholds. In some implementations, the traffic management device may obtain the one or more triggers or thresholds from another device, such as a server device or the user device.

For example, the traffic management device may include rules (e.g., the one or more triggers or thresholds), associated with routing traffic associated with the application between the serverless framework and the container-based framework, in a routing table. The routing table may be associated with a load balancer of the cloud computing environment. In some implementations, the traffic management device may be the load balancer of the cloud computing environment. In other examples, the traffic management device may communicate with the load balancer of the cloud computing environment (e.g., to configure the rules in the routing table).

Figure 1B:
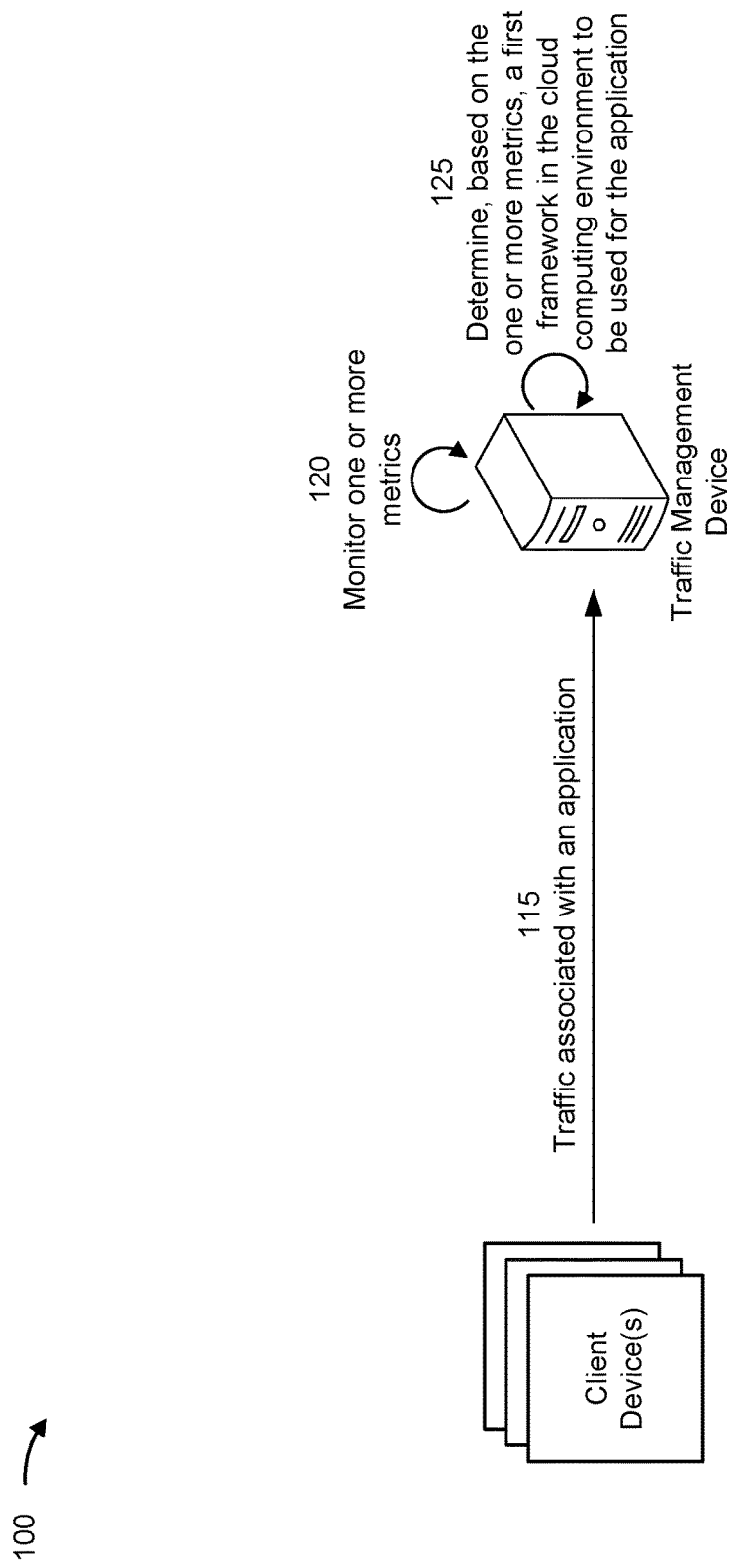

As shown in FIG. 1B, and by reference number 115, the traffic management device may obtain or receive traffic associated with the application. For example, the traffic may include requests associated with the application, API calls, and/or other traffic associated with the application. As shown in FIG. 1B, the traffic may be associated with (e.g., generated from) one or more client devices. The traffic may be associated with one or more users of the application (e.g., a given client device may be associated with a given user).

In some implementations, the traffic management device may route (e.g., initially) the traffic to the initial framework associated with the application. For example, the traffic management device may deploy the codebase via the initial framework and may route the traffic to the initial framework (e.g., via a serverless function or a container).

As shown by reference number 120, the traffic management device may monitor one or more metrics associated with the traffic. The one or more metrics include one or more performance metrics associated with the traffic, a time (or timing) associated with the traffic, and/or one or more system metrics associated with the cloud computing environment, among other examples. The one or more performance metrics may indicate information associated with the traffic, such as a usage level of the application, a throughput of the traffic, and/or a rate of the traffic, among other examples. For example, the one or more performance metrics may include a TPS metric, a requests per second metric, and/or a quantity of users associated with the traffic, among other examples.

The time (or timing) associated with the traffic may indicate when the traffic is arriving at the cloud computing environment. For example, the time associated with the traffic may indicate a time of day, a date (e.g., a day, a month, and/or a year), and/or other timing information associated with the traffic. The one or more system metrics associated with the cloud computing environment may indicate information associated with a performance of the cloud computing environment, such as a response time, a congestion level, and/or one or more limits associated with a usage of the cloud computing environment, among other examples. For example, the one or more system metrics may include a concurrency limit associated with the serverless framework and/or the container-based framework. The concurrency limit may be a maximum quantity of concurrent requests or tasks that the cloud computing environment can handle at any given time. The concurrency limit may represent the capacity of the cloud computing environment to manage simultaneous operations without compromising performance or causing errors. For example, the concurrency limit may be a serverless function concurrency limit (e.g., indicating a quantity of serverless functions that can be deployed, associated with a given entity, at a given time).

The traffic management device may periodically monitor the one or more metrics. For example, every X seconds, minutes, and/or hours the traffic management device may determine values or information associated with the one or more metrics. Additionally, or alternatively, the traffic management device may determine values or information associated with the one or more metrics based on detecting a trigger event. For example, the trigger event may include receiving a request (e.g., from a client device or a user device) to check the one or more metrics, receiving an indication of issues or an outage associated with the application, and/or another trigger event. In some implementations, the trigger event(s) may be indicated by the codebase (e.g., in a configuration file) or by another device, such as a server device or the user device.

In some implementations, the traffic management device may predict, using a machine learning model, the one or more metrics based on historical traffic associated with the application. For example, the machine learning model may be trained (e.g., using historical traffic and performance results of the historical traffic) to predict future values or information associated with the one or more metrics. Additionally, or alternatively, the machine learning model may be trained (e.g., using historical traffic and performance results of the historical traffic) to predict a best and/or most efficient framework to use for the application for an upcoming (e.g., future) period of time. For example, the machine learning model may be trained to predict and/or analyze trends in the one or more metrics of the traffic to determine a best and/or most efficient framework to use for the application for an upcoming period of time. The training and use of the machine learning model is described in more detail in connection with FIG. 2.

As shown by reference number 125, the traffic management device may determine a first framework in the cloud computing environment to be used for the application. For example, the traffic management device may determine, based on the one or more metrics, a framework (e.g., from the serverless framework and the container-based framework) in the cloud computing environment to be used for the application. For example, the traffic management device may determine that the traffic should be routed to a first framework if one or more values of the one or more metrics satisfy a threshold. The traffic management device may determine that the traffic should be routed to a second framework if the one or more values of the one or more metrics do not satisfy the threshold.

For example, the threshold may include a performance threshold (e.g., a TPS threshold, a requests per second threshold, and/or a user threshold). The traffic management device may determine that the traffic should be routed to a first framework if one or more values of one or more performance metrics satisfy the performance threshold. The traffic management device may determine that the traffic should be routed to a second framework if the one or more values of the performance one or more metrics do not satisfy the performance threshold.

For example, the traffic management device may determine that the traffic should be routed to a container if one or more values of the one or more metrics satisfy the performance threshold. The traffic management device may determine that the traffic should be routed to a serverless function if the one or more values of the one or more metrics do not satisfy the performance threshold. In some implementations, if a TPS of the traffic does not satisfy a TPS threshold, then the traffic management device may determine that the traffic should be routed to the serverless framework. If the TPS of the traffic satisfies the TPS threshold, then the traffic management device may determine that the traffic should be routed to the container-based framework.

Additionally, or alternatively, the traffic management device may determine a framework in the cloud computing environment to be used for the application based on a timing of the traffic. For example, certain times, dates, and/or time periods, among other examples, may be associated with a higher likelihood of increased traffic levels or decreased traffic levels. For example, daytime traffic (e.g., traffic that arrives during a daytime, such as between 9 AM and 8 PM) may typically be associated with higher TPS, higher requests per second, and/or a higher quantity of users, among other examples, as compared to nighttime traffic (e.g., traffic that arrives during a nighttime, such as between 9 PM and 8 AM). As another example, certain days or time periods may typically be associated with higher TPS, higher requests per second, and/or a higher quantity of users, among other examples, as compared to other days of time periods. For example, certain days may be associated with increased traffic levels, such as a date traditionally associated with sale events (e.g., "Black Friday" sale events in the United States).

For example, the traffic management device may determine that traffic should be routed to a first framework if the traffic is occurring during a first time period, on a first day, and/or on a first date, among other examples. The traffic management device may determine that traffic should be routed to a second framework if the traffic is occurring during a second time period, on a second day, and/or on a second date, among other examples. For example, the traffic management device may determine that traffic should be routed to a serverless function if the time associated with the traffic indicates that the traffic is occurring during a first time period (e.g., that is typically associated with lower traffic levels, or lower TPS values). The traffic management device may determine that traffic should be routed to a container if the time associated with the traffic indicates that the traffic is occurring during a second time period (e.g., that is typically associated with higher traffic levels, or higher TPS values).

Additionally, or alternatively, the traffic management device may determine a framework in the cloud computing environment to be used for the application based on system metrics associated with the cloud computing environment. For example, a system metric may include a response time associated with responding to, or completing, a task. The traffic management device may determine that traffic should be routed to a first framework if the response time (e.g., associated with the first framework or the second framework) satisfies a response threshold. The traffic management device may determine that traffic should be routed to a second framework if the response time (e.g., associated with the first framework or the second framework) does not satisfy a response threshold.

As another example, a system metric may include a concurrency limit. For example, the concurrency limit may indicate a limit on a quantity of serverless functions or containers that can be deployed (e.g., by an entity associated with the application) at a given time. The traffic management device may determine that traffic should be routed to a first framework based on a utilization of cloud resources associated with the second framework indicating that a concurrency limit (e.g., associated with the second framework) is met. Similarly, the traffic management device may determine that traffic should be routed to the second framework based on a utilization of cloud resources associated with the first framework indicating that a concurrency limit (e.g., associated with the first framework) is met. For example, the traffic management device may determine that traffic should be routed to a container based on a utilization of the serverless framework indicating that a concurrency limit (e.g., associated with a quantity of serverless function instances that can be deployed at a given time) is met.

Additionally, or alternatively, the traffic management device may determine a framework in the cloud computing environment to be used for the application based on a configuration file associated with the codebase. For example, in some cases, the configuration file may indicate which framework is to be used to deploy the codebase. For example, in some scenarios (such as testing or beta deployment scenarios), it may be desirable to deploy the codebase via a given framework so as to not impact traffic being processed via another framework. Therefore, a configuration file may dictate which framework in the cloud computing environment to be used for the application and/or the codebase. For example, the configuration file associated with the codebase may indicate whether the traffic is to be routed to a serverless function or a container.

In some implementations, the traffic management device may determine a first portion of the traffic to be routed to a first framework and a second portion of the traffic to be routed to the second framework. For example, the traffic management device may split the traffic between first framework and the second framework (e.g., between the serverless framework and the container-based framework), where the split (e.g., the first portion and the second portion) is based on the one or more metrics, in a similar manner as described above. For example, the traffic management device may determine that more traffic (e.g., 75% of the traffic) is to be routed to a first framework and less traffic (e.g., 25% of the traffic) is to be routed to a second framework based on the one or more metrics, in a similar manner as described above. For example, the traffic management device may determine that a first portion of the traffic is to be routed to a serverless function and that a second portion of the traffic is to be routed to a container (e.g., where the first portion and the second portion are based on the one or more metrics). For example, in high TPS scenarios, the second portion (e.g., routed to the container) may be greater than the first portion (e.g., routed to the serverless function). In low TPS scenarios, the first portion (e.g., routed to the serverless function) may be greater than the second portion (e.g., routed to the container).

Figure 1C:
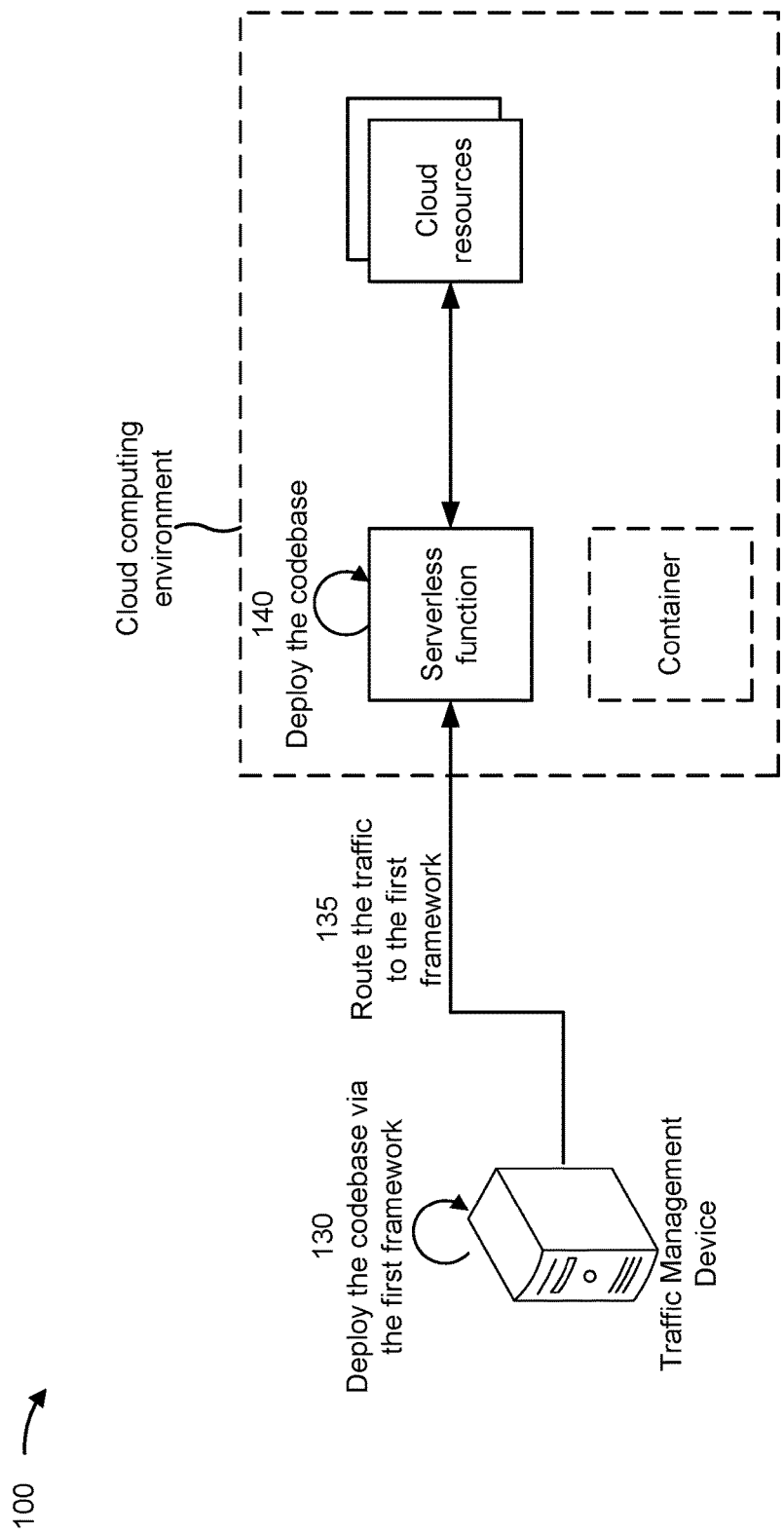

As shown in FIG. 1C, and by reference number 130, the traffic management device may deploy the codebase via the first framework. For example, the traffic management device may cause cloud resources, associated with the first framework, to be deployed in the cloud computing environment. FIG. 1C shows the serverless framework as the first framework as an example. For example, the traffic management device may cause a serverless function to be deployed in the cloud computing environment to be used to process and/or perform tasks associated with the application. Alternatively, if the first framework is the container-based framework, then the traffic management device may cause a container to be deployed in the cloud computing environment to be used to process and/or perform tasks associated with the application.

As shown in FIG. 1C, resources associated with the second framework may not be deployed in the cloud computing environment (e.g., shown by the dashed line of the container in FIG. 1C). For example, the traffic management device may cause a utilization of cloud resources associated with the second framework to be reduced or stopped (e.g., based on routing the traffic, or a larger portion of the traffic, to the first framework as described herein).

As shown by reference number 135, the traffic management device may route the traffic to the first framework. For example, as shown in FIG. 1C, the traffic management device may cause the traffic to be provided to the serverless function. As shown by reference number 140, a resource (e.g., the serverless function) of the first framework (e.g., the serverless framework) may deploy the codebase (or a portion of the codebase) via cloud resources associated with the cloud computing environment. For example, the serverless function may cause one or more tasks, associated with the traffic, to be performed via the cloud resources of the cloud computing environment.

In some implementations, the traffic management device may route, based on the one or more metrics, traffic for respective services of one or more services associated with the application to cloud resources associated with the first framework or to the second framework. For example, the application may be associated with multiple services. The traffic management device may handle traffic for each service separately, in a similar manner as described elsewhere herein. Alternatively, the traffic management device may handle traffic for all services together, in a similar manner as described elsewhere herein. In some implementations, the traffic management device may serve as a reverse proxy for one or more services of the application (e.g., associated with being a midpoint between the client devices and multiple servers or frameworks). For example, the traffic management device may route traffic from the one or more client devices to an appropriate framework in the cloud computing environment. Additionally, the traffic management device may route traffic from the framework in the cloud computing environment to the one or more client devices.

Figure 1D:
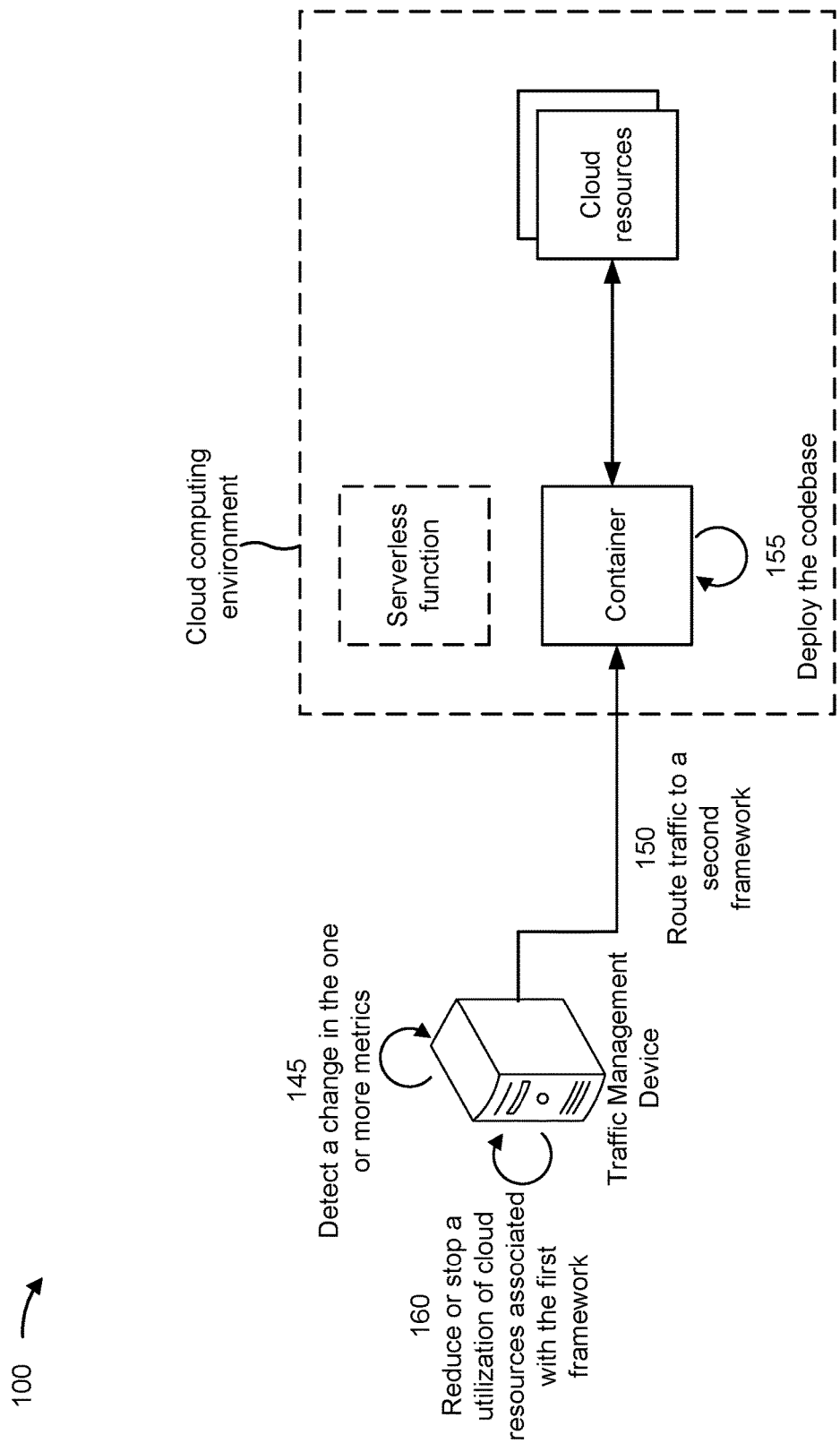

As shown in FIG. 1D, and by reference number 145, the traffic management device may detect a change in the one or more metrics. For example, based on monitoring the one or more metrics, as described elsewhere herein, the traffic management device may detect the change in the one or more metrics. For example, the change may be associated with one or more values of the one or more metrics changing from satisfying a threshold described herein to no longer satisfying the threshold, or vice versa (e.g., changing from not satisfying a threshold described herein to now satisfying the threshold). As another example, the change may be associated with a timing of the traffic (e.g., the timing of the traffic may change from daytime traffic to nighttime traffic). As another example, the change may be associated with a system metric of the cloud computing environment. For example, the traffic management device may detect that a concurrency limit associated with the first framework is met.

The traffic management device may deploy, based on detecting the change in one or more values associated with the one or more metrics, the codebase via the second framework. For example, the traffic management device may cause one or more resources to be deployed (e.g., and/or a utilization of resources to be increased) associated with the second framework. As an example, and as shown in FIG. 1D, the second framework may be the container-based framework.

As shown by reference number 150, the traffic management device may route, based on detecting the change in one or more values associated with the one or more metrics, traffic to the second framework. For example, the traffic management device may cause the traffic associated with the application to be provided to the container (e.g., rather than the serverless function) based on detecting the change. As shown by reference number 155, a resource (e.g., the container) of the second framework (e.g., the container-based framework) may deploy the codebase (or a portion of the codebase) via cloud resources associated with the cloud computing environment. For example, the container may cause one or more tasks, associated with the traffic, to be performed via the cloud resources of the cloud computing environment. For example, the container may deploy or use the same codebase that was used by the serverless function (e.g., as described above in connection with FIG. 1C).

As shown by reference number 160, the traffic management device may cause, based on routing the traffic to the second framework, a utilization of cloud resources associated with the first framework in the cloud computing environment to be reduced or stopped. For example, the traffic management device may cause the serverless function to be shut down or terminated (e.g., may "spin down" resources associated with the serverless framework). This reduces a cost of using the cloud computing environment and/or conserves cloud resources, processing resources, and/or memory resources that would have otherwise been used to run, manage, and/or maintain the cloud resources associated with the first framework that are no longer being used.

As indicated above, FIGS. 1A-1D are provided as an example. Other examples may differ from what is described with regard to FIGS. 1A-1D.

Figure 2:
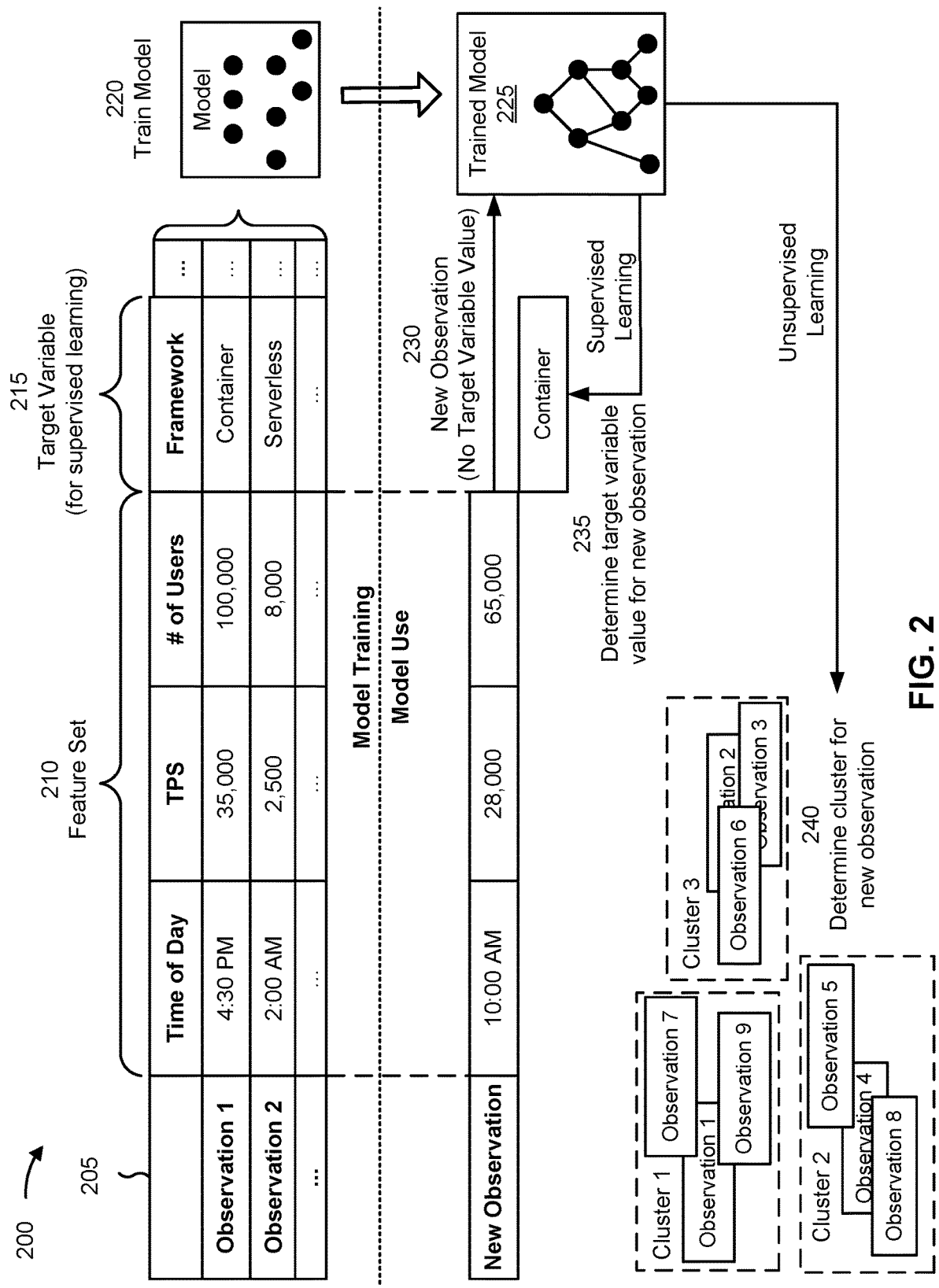
FIG. 2 is a diagram illustrating an example of training and using a machine learning model in connection with smart routing of traffic in a cloud computing environment, in accordance with some embodiments of the present disclosure.

FIG. 2 is a diagram illustrating an example 200 of training and using a machine learning model in connection with smart routing of traffic in a cloud computing environment. The machine learning model training and usage described herein may be performed using a machine learning system. The machine learning system may include or may be included in a computing device, a server, a cloud computing environment, or the like, such as the cloud computing environment and/or the traffic management device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from one or more client devices, the user device, and/or a memory of the traffic management device, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from one or more client devices, the user device, and/or a memory of the traffic management device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of "time of day," a second feature of "TPS," a third feature of "quantity (#) of users," and so on. As shown, for a first observation, the first feature may have a value of 4:30 PM, the second feature may have a value of 35,000, the third feature may have a value of 100,000, and so on. These features and feature values are provided as examples, and may differ in other examples. For example, the feature set may include one or more of the following features: one or more performance metrics, a requests per second value, one or more system metrics (e.g., of the cloud computing environment), a response time, a concurrency limit of a framework, a date of the traffic, a day (e.g., of the week) of the traffic, one or more configuration parameters, a type of traffic, a type of application associated with the traffic (e.g., a category of the application), a service associated with the traffic (e.g., where the application is associated with multiple services), and/or a location of a client device associated with the traffic, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is "Framework," which has an entry of "Container" (e.g., a container-based framework) for the first observation.

The feature set and target variable described above are provided as examples, and other examples may differ from what is described above. For example, for a target variable of "TPS," the feature set may include a type of traffic, a type of application associated with the traffic (e.g., a category of the application), a service associated with the traffic (e.g., where the application is associated with multiple services), and/or a timing of the traffic (e.g., a time, a date, and/or a day), among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on historical traffic associated with an application, a framework used to process the traffic, and/or a result of the processing of the traffic. For example, the historical traffic may be associated with performance results (e.g., a response time, a cost, or another performance result) associated with the framework used to process the traffic. The machine learning model may be trained based on the performance results (e.g., if traffic is processed with good performance and/or low cost using a given framework and a set of metrics, then the machine learning model may be trained to predict that the given framework should be used for traffic associated with similar metrics in the future).

As shown by reference number 230, the machine learning system may apply the trained machine learning model 225 to a new observation, such as by receiving a new observation and inputting the new observation to the trained machine learning model 225. As shown, the new observation may include a first feature of "10:00 AM," a second feature of "28,000,", a third feature of "65,000," and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "Container" for the target variable of "Framework" for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, to route traffic to a container and/or a container-based framework of the cloud computing environment. The first automated action may include, for example, routing the traffic to the container and/or the container-based framework, causing a container to be deployed in the cloud computing environment, deploying a codebase associated with the application via the container, and/or causing a utilization of a serverless function and/or serverless framework of the cloud computing environment to be reduced or stopped, among other examples.

As another example, if the machine learning system were to predict a value of "Serverless" for the target variable of "Framework", then the machine learning system may provide a second (e.g., different) recommendation (e.g., to route traffic to a serverless function and/or a serverless framework of the cloud computing environment) and/or may perform or cause performance of a second (e.g., different) automated action (e.g., routing the traffic to the serverless function and/or a serverless framework, causing a serverless function to be deployed in the cloud computing environment, deploying a codebase associated with the application via the serverless function, and/or causing a utilization of a container and/or container-based framework to be reduced or stopped).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., traffic associated with a container), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., traffic associated with a serverless function), then the machine learning system may provide the second (e.g., different) recommendation and/or may perform or cause performance of the second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include performance results of traffic processed via a recommended framework, a response time of traffic processed via a recommended framework, and/or a cost of cloud resources associated with a recommended framework, among other examples.

In this way, the machine learning system may apply a rigorous and automated process to predict metrics and/or an appropriate framework for traffic associated with a cloud computing environment. The machine learning system may enable recognition and/or identification of tens, hundreds, thousands, or millions of features and/or feature values for tens, hundreds, thousands, or millions of observations, thereby increasing accuracy and consistency and reducing delay associated with predicting metrics and/or an appropriate framework for traffic associated with the cloud computing environment relative to requiring computing resources to be allocated for tens, hundreds, or thousands of operators to manually predict metrics and/or an appropriate framework for traffic associated with the cloud computing environment using the features or feature values.

As indicated above, FIG. 2 is provided as an example. Other examples may differ from what is described in connection with FIG. 2.

Figure 3:
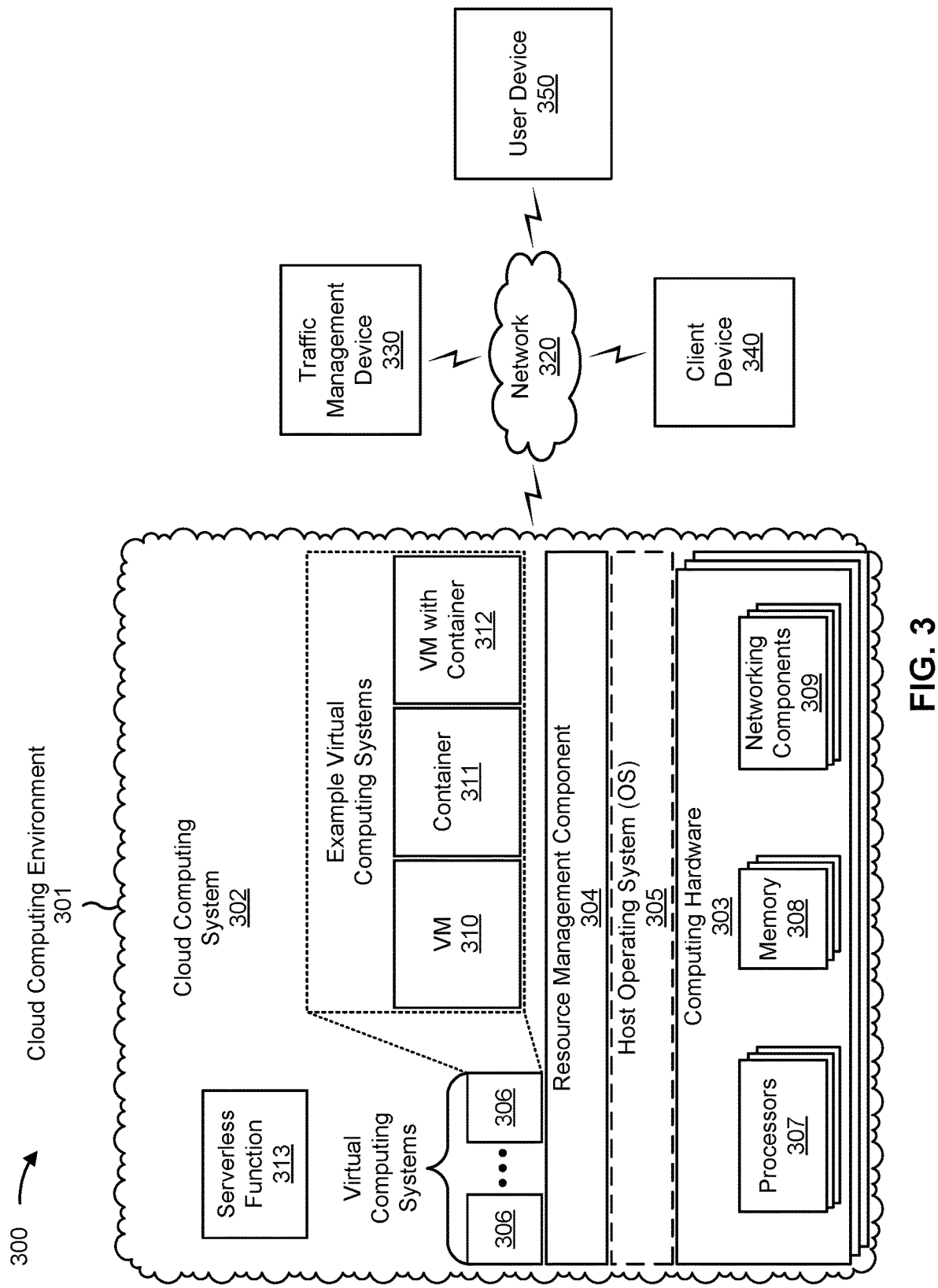
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a cloud computing environment 301, which may include one or more elements of and/or may execute within a cloud computing system 302. The cloud computing system 302 may include one or more elements 303-313, as described in more detail below. As further shown in FIG. 3, environment 300 may include a network 320, a traffic management device 330, a client device 340, and/or a user device 350. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A container 311 may include an environment associated with executing an application in the cloud computing system 302. For example, a container 311 may include application code, runtime, system tools, libraries, and/or settings, among other examples, associated with executing an application. In some implementations, each container 311 may be associated with a dedicated file system, network interfaces, and/or process namespace, among other examples. Containers 311 and virtual machines 310 may provide isolation and abstraction for applications. In some implementations, a container 311 may be referred to as a Docker container, such as when a container 311 utilizes Docker as a containerization platform. A virtual machine 310 may be associated with a full copy of a host operating system (e.g., the host operating system 305) to enable the virtual machine 310 to operate. A container 311 may share a host operating system kernel with the cloud computing system 302 and may only include the software libraries and dependencies needed to run an application (e.g., enabling the container 311 to be smaller in size than a virtual machine 310 and to stop and/or start operations faster than a virtual machine 310).

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

The cloud computing system 302 may include a serverless function 313. The serverless function 313 may be referred to as an anonymous function and/or a lambda function, among other examples. The serverless function 313 may include code that executes in the cloud computing environment 301 and that is executed in response to a specific trigger or event. The serverless function 313 may enable a provider associated with the cloud computing environment 301 to provision infrastructure and/or resources (e.g., computing hardware 303, one or more virtual computing systems 306, one or more processors 307, one or more memories 308, one or more networking components 309, one or more virtual machines 310, one or more containers 311, and/or one or more hybrid environments 312) in response to tasks and/or requests to be performed in the cloud computing environment 301. For example, the serverless function 313 may enable the provider to abstract away the underlying infrastructure and to handle the management, maintenance and/or scaling of resources for executing user-defined functions associated with the serverless function 313.

Although the cloud computing environment 301 may include one or more elements 303-313 of the cloud computing system 302, may execute within the cloud computing system 302, and/or may be hosted within the cloud computing system 302, in some implementations, the cloud computing environment 301 may not be cloud-based (e.g., may be implemented outside of a cloud computing system) or may be partially cloud-based. For example, the cloud computing environment 301 may include one or more devices that are not part of the cloud computing system 302, such as device 400 of FIG. 4, which may include a standalone server or another type of computing device. The cloud computing environment 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The traffic management device 330 may include one or more devices capable of receiving, generating, storing, processing, providing, and/or routing information associated with smart routing of traffic in the cloud computing environment 301, as described elsewhere herein. The traffic management device 330 may include a communication device and/or a computing device. For example, the traffic management device 330 may include a server, such as an application server, a client server, a web server, a database server, a host server, a proxy server, a virtual server (e.g., executing on computing hardware), or a server in a cloud computing system. In some implementations, the traffic management device 330 may include computing hardware used in a cloud computing environment, such as the cloud computing environment 301. In some implementations, the traffic management device 330 may be, or may include, a traffic load balancer of the cloud computing environment 301.

The client device 340 may include one or more devices capable of receiving, generating, storing, processing, and/or providing information associated with smart routing of traffic in the cloud computing environment 301, as described elsewhere herein. The client device 340 may include a communication device and/or a computing device. For example, the client device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The user device 350 may include one or more devices capable of receiving, generating, storing, processing, and/or providing information associated with smart routing of traffic in the cloud computing environment 301, as described elsewhere herein. The user device 350 may include a communication device and/or a computing device. For example, the user device 350 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
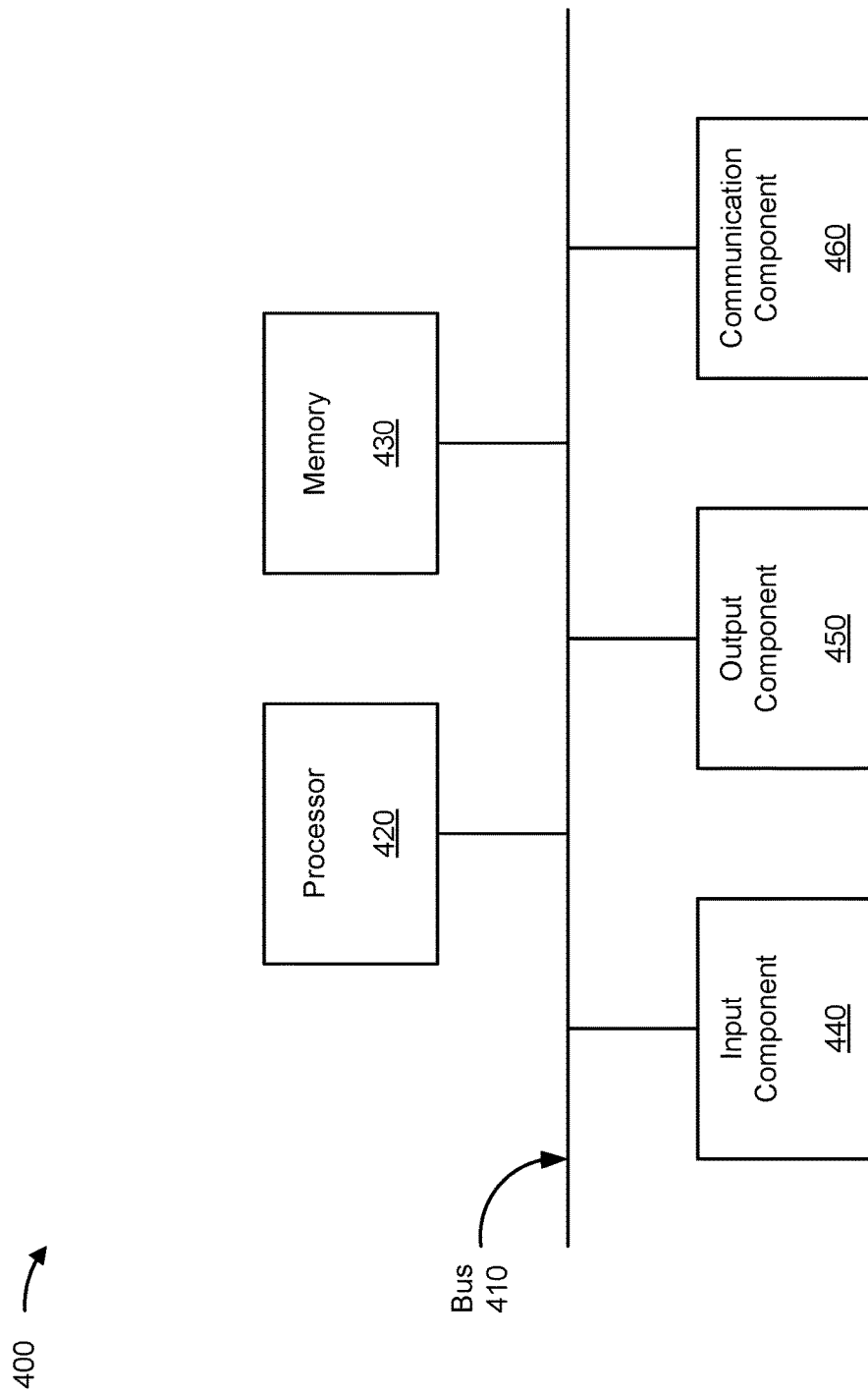
FIG. 4 is a diagram of example components of a device associated with smart routing of traffic in a cloud computing environment, in accordance with some embodiments of the present disclosure.

FIG. 4 is a diagram of example components of a device 400 associated with smart routing of traffic in a cloud computing environment. The device 400 may correspond to the traffic management device 330, the client device 340, the user device 350, and/or one or more components or devices of the cloud computing environment 301. In some implementations, the traffic management device 330, the client device 340, the user device 350, and/or one or more components or devices of the cloud computing environment 301 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with smart routing of traffic in a cloud computing environment. In some implementations, one or more process blocks of FIG. 5 may be performed by the traffic management device 330. In some implementations, one or more process blocks of FIG. 5 may be performed by another device or a group of devices separate from or including the traffic management device 330, such as a device or component of the cloud computing environment 301, a client device 340, and/or a user device 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining a codebase, associated with an application, that is deployable via both a first framework of the cloud computing environment and a second framework of the cloud computing environment (block 510). For example, the traffic management device 330 (e.g., using processor 420 and/or memory 430) may obtain a codebase, associated with an application, that is deployable via both a first framework of the cloud computing environment and a second framework of the cloud computing environment, as described above in connection with reference number 105 of FIG. 1A. As an example, the traffic management device 330 may obtain the codebase (e.g., from user device and/or a code repository) that is capable of being deployed by both a serverless function and a container in the cloud computing environment.

As further shown in FIG. 5, process 500 may include receiving the traffic associated with the application (block 520). For example, the traffic management device 330 (e.g., using processor 420, memory 430, input component 440, and/or communication component 460) may receive the traffic associated with the application, as described above in connection with reference number 115 of FIG. 1B. As an example, the traffic management device 330 may obtain traffic via requests and/or API calls associated with an application.

As further shown in FIG. 5, process 500 may include monitoring one or more metrics associated with the traffic (block 530). For example, the traffic management device 330 (e.g., using processor 420 and/or memory 430) may monitor one or more metrics associated with the traffic, as described above in connection with reference number 120 of FIG. 1B. As an example, the traffic management device 330 may monitor one or more performance metrics associated with the traffic, a time associated with the traffic, and/or one or more system metrics associated with the cloud computing environment, among other examples.

As further shown in FIG. 5, process 500 may include deploying, based on the one or more metrics, the codebase via the first framework or the second framework in the cloud computing environment (block 540). For example, the traffic management device 330 (e.g., using processor 420 and/or memory 430) may deploy, based on the one or more metrics, the codebase via the first framework or the second framework in the cloud computing environment, as described above in connection with reference number 130 of FIG. 1C. As an example, the traffic management device 330 may cause a serverless function to be deployed in the cloud computing environment. The traffic management device 330 may cause the serverless function to deploy the codebase.

As further shown in FIG. 5, process 500 may include routing, based on the one or more metrics, the traffic to the first framework or to the second framework (block 550). For example, the traffic management device 330 (e.g., using processor 420 and/or memory 430) may route, based on the one or more metrics, the traffic to the first framework or to the second framework, as described above in connection with reference number 135 of FIG. 1C. As an example, the traffic management device 330 may cause the traffic (or a portion of the traffic) to be provided to the serverless function deployed in the cloud computing environment. The serverless function may cause one or more tasks to be performed, using cloud resources, associated with the traffic.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for routing traffic in a cloud computing environment that includes a serverless framework and a container-based framework, the system comprising:
   one or more memories; and
   one or more processors, communicatively coupled to the one or more memories, configured to:
      obtain a codebase, associated with an application, that is deployable via both the serverless framework of the cloud computing environment and the container-based framework of the cloud computing environment,
         wherein the codebase is deployable via a serverless function associated with the serverless framework and via a container associated with the container-based framework;
      receive the traffic associated with the application;
      monitor one or more metrics associated with the traffic,
         wherein the one or more metrics include at least one of one or more performance metrics associated with the traffic, a time associated with the traffic, or one or more system metrics associated with the cloud computing environment, and wherein the one or more metrics are associated with a performance threshold;
deploy, based on the one or more metrics and using the codebase, the serverless function or the container in the cloud computing environment; and
route, based on one or more values of the one or more metrics satisfying the performance threshold, the traffic to the serverless function or to the container, wherein the performance threshold is indicated by the codebase.

2. The system of claim 1, wherein the one or more processors, to route the traffic, are configured to:
route the traffic to:
the container if the one or more values of the one or more metrics satisfy the performance threshold.

3. The system of claim 1, wherein the one or more processors, to monitor the one or more metrics associated with the traffic, are configured to:
predict, using a machine learning model, the one or more metrics based on historical traffic associated with the application.

4. The system of claim 1, wherein the one or more processors, to route the traffic, are configured to:
route, based on the one or more metrics, the traffic to the serverless function; and
wherein the one or more processors are further configured to:
cause, based on routing the traffic to the serverless function, a utilization of cloud resources associated with the container in the cloud computing environment to be reduced or stopped.

5. The system of claim 1, wherein the one or more processors, to route the traffic, are configured to:
route a first portion of the traffic to the serverless function; and
route a second portion of the traffic to the container, wherein the first portion and the second portion are based on the one or more metrics.

6. The system of claim 1, wherein the one or more system metrics associated with the cloud computing environment include a concurrency limit, and wherein the one or more processors, to route the traffic, are configured to:
route the traffic to the container based on a utilization of the serverless framework indicating that the concurrency limit is met.

7. The system of claim 1, wherein the one or more processors are further configured to:
obtain a configuration file associated with the codebase that indicates whether the traffic is to be routed to the serverless function or the container, and
wherein the one or more processors, to route the traffic, are configured to:
route the traffic to the serverless function or the container based on whether the traffic is to be routed to the serverless function or the container.

8. The system of claim 1, wherein the one or more performance metrics include at least one of:
a transactions per second (TPS) metric,
a requests per second metric, or
a quantity of users.

9. The system of claim 1, wherein the one or more processors, to route the traffic, are configured to:
route the traffic to:
the serverless function if the time associated with the traffic indicates that the traffic is occurring during a first time period, or
the container if the time associated with the traffic indicates that the traffic is occurring during a second time period.

10. A method for routing traffic in a cloud computing environment, comprising:
obtaining, by a device, a codebase, associated with an application and one or more services of the application, that is deployable via both a first framework of the cloud computing environment and a second framework of the cloud computing environment;
receiving, by the device, the traffic associated with the application;
monitoring, by the device, one or more metrics associated with the traffic,
wherein the one or more metrics are associated with a performance threshold;
determining, by the device and based on the one or more metrics, that the first framework or the second framework is to be used for the traffic;
deploying, by the device and based on the determining, the codebase via the first framework or the second framework in the cloud computing environment; and
routing, based on one or more values of the one or more metrics satisfying the performance threshold, the traffic to the first framework or to the second framework, wherein the performance threshold is indicated by the codebase.

11. The method of claim 10, wherein the first framework includes a container-based framework and the second framework includes a serverless framework.

12. The method of claim 10, wherein routing the traffic comprises:
routing the traffic to:
the first framework if the one or more values of the one or more metrics satisfy the performance threshold.

13. The method of claim 10, wherein routing the traffic comprises:
route, based on the one or more metrics, traffic for respective services of the one or more services to cloud resources associated with the first framework or to the second framework.

14. The method of claim 10, wherein routing the traffic comprises:
routing, based on the one or more metrics, the traffic to the first framework, and
the method further comprising:
detecting, based on monitoring the one or more metrics, a change in the one or more values of the one or more metrics;
deploying, based on detecting the change in the one or more values of the one or more metrics, the codebase via the second framework; and
routing, based on detecting the change in the one or more values of the one or more metrics, the traffic to the second framework.

15. The method of claim 14, further comprising:
causing, based on routing the traffic to the second framework, a utilization of cloud resources associated with the first framework in the cloud computing environment to be reduced or stopped.

16. The method of claim 10, wherein the one or more metrics include at least one of:
a transactions per second (TPS) metric,
a requests per second metric,
a quantity of users,
a timing associated with the traffic, or one or more system metrics associated with the cloud computing environment.

17. A non-transitory computer-readable medium storing a set of instructions, the set of instructions comprising:
one or more instructions that, when executed by one or more processors of a device, cause the device to:
obtain a codebase, associated with an application, that is deployable via both a serverless framework of a cloud computing environment and a container-based framework of the cloud computing environment,
receive traffic associated with the application;
predict, via a machine learning model, one or more metrics associated with the traffic,
wherein the one or more metrics are associated with a performance threshold;
select, based on the one or more metrics, the serverless framework or the container-based framework for the traffic;
deploy, based on the selecting, a serverless function associated with the serverless framework or a container associated with the container-based framework; and
route, based on one or more values of the one or more metrics satisfying the performance threshold, the traffic to the serverless function or to the container, wherein the performance threshold is indicated by the codebase.

18. The non-transitory computer-readable medium of claim 17, wherein the one or more instructions, that cause the device to route the traffic, cause the device to:
route, based on the one or more metrics, the traffic to the serverless function; and
wherein the one or more instructions further cause the device to:
cause, based on routing the traffic to the serverless function, a utilization of cloud resources associated with the container in the cloud computing environment to be reduced or stopped.

19. The non-transitory computer-readable medium of claim 17, wherein the one or more instructions, that cause the device to route the traffic, cause the device to:
route a first portion of the traffic to the serverless function; and
route a second portion of the traffic to the container,
wherein the first portion and the second portion are based on the one or more metrics.

20. The non-transitory computer-readable medium of claim 17, wherein the one or more metrics include a concurrency limit, and wherein the one or more instructions, that cause the device to route the traffic, cause the device to:
route the traffic to the container based on a utilization of the serverless framework indicating that the concurrency limit is met.

* * * * *